United States Patent
Padberg

[19]

[11] Patent Number: 6,082,269
[45] Date of Patent: Jul. 4, 2000

[54] HITCH-MOUNTABLE ACCESSORY

[76] Inventor: Patrick H. Padberg, 8417 Highland La., Alexandria, Va. 22309

[21] Appl. No.: 09/251,544

[22] Filed: Feb. 17, 1999

[51] Int. Cl.[7] .................................................. A47B 23/00
[52] U.S. Cl. ................................................................ 108/44
[58] Field of Search ..................... 108/44, 50 R, 108/94, 95; 224/519; 297/172, 174, 170, 171, 217.1

[56] References Cited

U.S. PATENT DOCUMENTS

| | | | |
|---|---|---|---|
| 304,385 | 9/1884 | Weaver | 108/95 |
| 556,566 | 3/1896 | Stevens | 108/95 X |
| 570,403 | 10/1896 | Hunt et al. | 108/50.12 X |
| 732,227 | 6/1903 | Shafer et al. | 108/95 X |
| 3,289,612 | 12/1966 | Mouw | 108/50.12 |
| 3,295,473 | 1/1967 | Wentworth | 108/44 X |
| 4,519,409 | 5/1985 | Kinney et al. | |
| 5,161,561 | 11/1992 | Jamieson | 108/94 X |
| 5,232,133 | 8/1993 | Speer | |
| 5,267,748 | 12/1993 | Curran | |
| 5,310,100 | 5/1994 | Liscinsky | |
| 5,397,147 | 3/1995 | Ducharme | |
| 5,458,389 | 10/1995 | Young | |
| 5,626,126 | 5/1997 | McNulty | |
| 5,640,949 | 6/1997 | Smith | |
| 5,752,636 | 5/1998 | Manley | |
| 5,752,639 | 5/1998 | Rice | |
| 5,800,294 | 9/1998 | Naecker, Jr. | |
| 5,857,741 | 1/1999 | Anderson | 108/44 X |

OTHER PUBLICATIONS

Damark Catalogue, publication date unknown but believed to be Fall or Winter 1998, p. 7.

1998 Steel Horse Automotive Accessory Catalogue, p. 31, Compton, CA.

*Primary Examiner*—Jose V. Chen
*Attorney, Agent, or Firm*—Dennis H. Lambert

[57] ABSTRACT

A hitch-mountable table and umbrella assembly for support on a vehicle-mounted hitch. The assembly includes a base member with a horizontal component for releasable engagement with the hitch receiver tube of the hitch, and an upwardly extending vertical component. A first table and/or umbrella may be supported directly on the vertical component, and a second table may be rotatably mounted in vertically spaced relation above the first table when an adapter is used, with or without an umbrella.

18 Claims, 6 Drawing Sheets

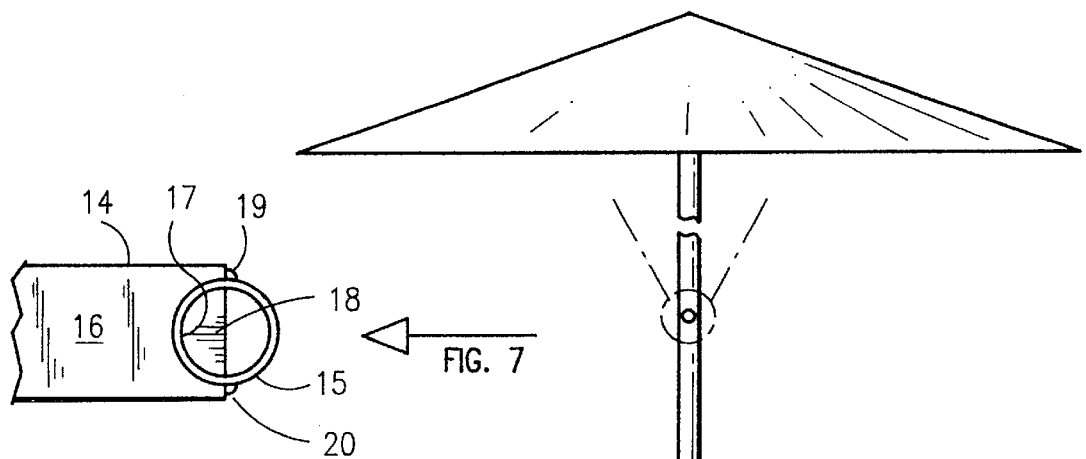
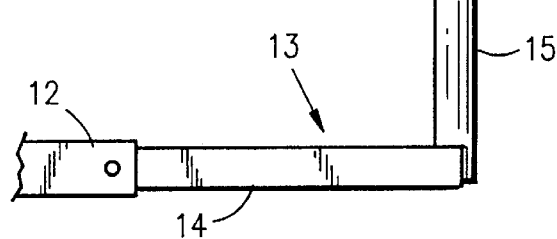
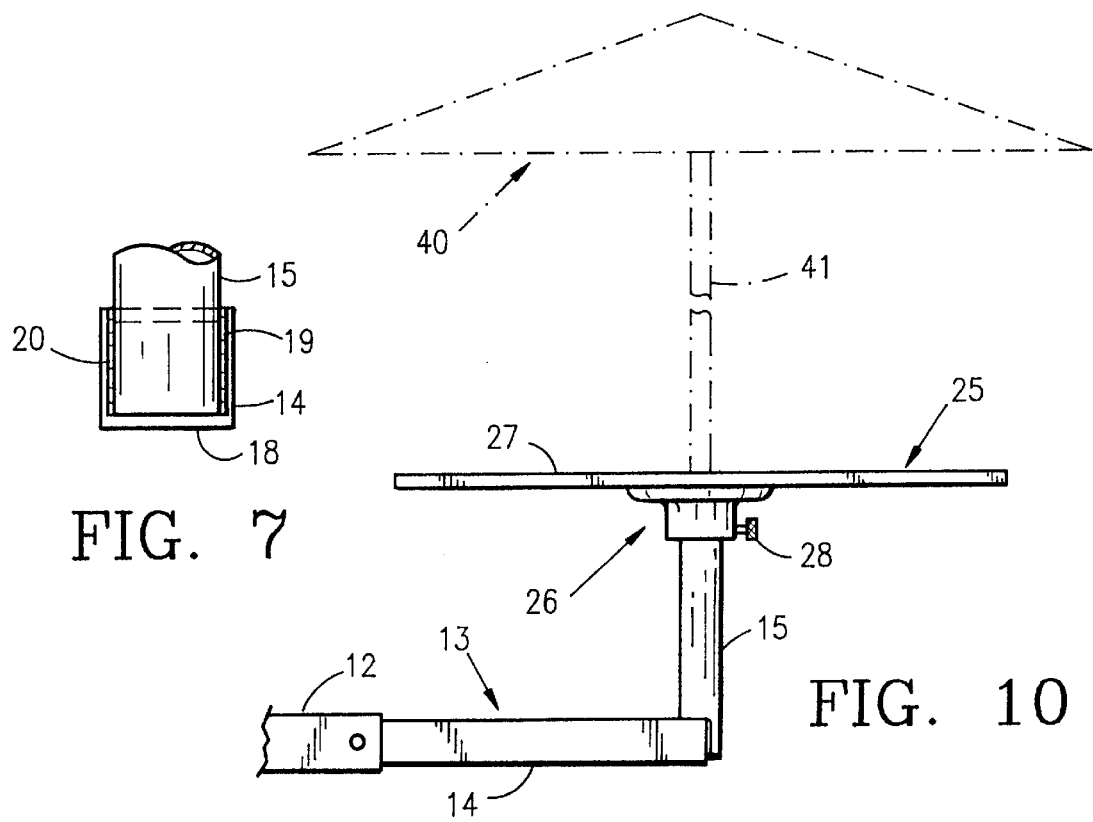
FIG. 6
FIG. 7
FIG. 9
FIG. 10

6,082,269

HITCH-MOUNTABLE ACCESSORY

BACKGROUND OF THE INVENTION

1. Field of the Invention

This invention relates generally to vehicle accessories, and more specifically, to a vehicle accessory that is mountable to a trailer hitch on a vehicle. In particular, the invention comprises a table and umbrella assembly that is mountable to the hitch receiver of a vehicle-mounted trailer hitch.

2. Prior Art

Many vehicles have hitch assemblies for pulling a trailer. Perhaps the most common form of hitch assembly is attached to the frame of the vehicle and has a square hitch-receiving tube for releasable attachment of a draw bar and trailer. Except when the vehicle is being used to tow a trailer, the hitch assembly serves no useful purpose.

Many devices have been proposed in the prior art for utilizing the hitch assembly for purposes other than towing a vehicle, including load extenders as disclosed in U.S. Pat. Nos. 5,458,389 and 5,752,636, grilling or cooking apparatus as disclosed in U.S. Pat. Nos. 5,626,126 and 5,640,949, tool support or work platform apparatus as disclosed in U.S. Pat. Nos. 5,267,748 and 5,397,147, game apparatus as disclosed in U.S. Pat. No. 5,800,294, storage apparatus as disclosed in U.S. Pat. No. 5,310,100, and general utility holders for holding such items as a table or a bicycle rack etc., as disclosed in U.S. Pat. No. 5,752,639. All of the patented devices noted above have apparatus for telescopic cooperation with the hitch receiver tube on a vehicle-mounted hitch. These apparatus generally include a horizontal member that is releasably engaged in the hitch receiver, with means on an outer end of the horizontal member for supporting a work platform or other device, depending upon the intended use of the apparatus.

U.S. Pat. No. 5,752,639, noted above, discloses an apparatus removably mountable on the hitch receiver of a vehicle-mounted hitch, in which a horizontal component is adapted to telescope into a hitch receiver tube, and a vertical component is adapted to support a table or other platform.

An assembly similar to that shown in U.S. Pat. No. 5,752,639 is offered for sale in the Steel Horse 1998 Automotive Accessory Catalogue, page 31. The apparatus offered for sale in this catalogue includes a member having horizontal and vertical components such as disclosed in the '639 patent, but in addition to supporting a table, this publication also discloses the support of an umbrella on the vertical component.

U.S. Pat. No. 3,295,473 discloses a picnic table and umbrella combination that is supported on the front bumper of a vehicle.

U.S. Pat. Nos. 3,295,473 and 5,752,639, and the Steel Horse publication, are believed to be more relevant to the present invention than the other publications cited above, in that they disclose removable vehicle mounted assemblies for supporting a table (U.S. Pat. No. 5,752,639) and/or table and umbrella combination (U.S. Pat. No. 3,295,473). However, the systems disclosed in these prior art publications have structures and functions that differ considerably from the present invention, and the present invention has greater versatility than the apparatus disclosed in these prior publications, especially for its intended use.

For instance, none of these prior art devices provides a hitch-mountable system for selectively supporting only an umbrella, or only a table, or multiple tables, or one or more tables and an umbrella, as desired. Moreover, none of these prior art systems discloses an arrangement wherein multiple tables are provided in vertically spaced relationship, with at least one of the tables being freely rotatable relative to the other. Still further, none of the prior art systems discloses an arrangement wherein an umbrella is supported for rotation relative to a table, whereby the umbrella may be oriented to different positions and angularly inclined for optimum shading effect.

SUMMARY OF THE INVENTION

The present invention provides a hitch-mountable table and umbrella system that is economical to make and easy to use, wherein one or multiple tables may be used in combination, either with or without an umbrella, or an umbrella may be used alone or in combination with one or more tables.

The invention further provides a hitch-mountable table and umbrella system in which a first table is removably mountable in a fixed position relative to a support, and a second table smaller than the first table is removably mounted adjacent but spaced above the first table for rotational movement relative to the first table, whereby it can function as a Lazy Susan. Additionally, an umbrella may be optionally mounted in association with the tables, for vertical and rotational adjustment to optimize effectiveness of the umbrella.

Further, the present invention comprises a hitch-mountable table and umbrella system that may be easily assembled and disassembled without the use of tools, and which is compact for storage when disassembled.

To achieve the foregoing, the invention incorporates a base member having a horizontal component for telescopic engagement in the hitch receiver of a vehicle-mounted hitch, and a vertical component for telescopic engagement with and support of various table and umbrella combinations. The various table and umbrella combinations are made possible, at least in part, by use of an elongate adapter member that is supported by the base member and extends vertically upwardly therefrom. The vertical component of the base member is adapted to support an umbrella alone, with or without use of the adapter member, or a first table, with or without use of the adapter member and with or without use of an umbrella.

When the adapter member is used, a second table may be supported in vertically spaced relationship from the first table, and a predetermined vertically spaced relationship between the first and second tables may be maintained by use of a spacer sleeve disposed in surrounding relationship to the adapter member and resting at its lower end on top of the first table. The second table is then secured to the sleeve, whereby the sleeve and second table are freely rotatable about the adapter member and relative to the first table. An umbrella may be used in combination with the first and second tables, if desired, by supporting the umbrella shaft in the adapter member.

As should be apparent from the foregoing summary and the detailed description which follows, the invention has greater versatility than the prior art devices, and at the same time is simple and economical in construction, and easy to use.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein:

FIG. 6 is a transverse view in section taken along line 6—6 in FIG. 3;

FIG. 7 is an end view in elevation taken in the direction of the arrow 7 in FIG. 6;

FIG. 9 is a somewhat schematic view in side elevation of the base member used with only an umbrella;

FIG. 10 is a view similar to FIG. 9, with only one table used with the base member, and showing in dot-and-dash lines how an umbrella may be used in combination with the single table and base member.

DESCRIPTION OF THE PREFERRED EMBODIMENTS

Figure 1:
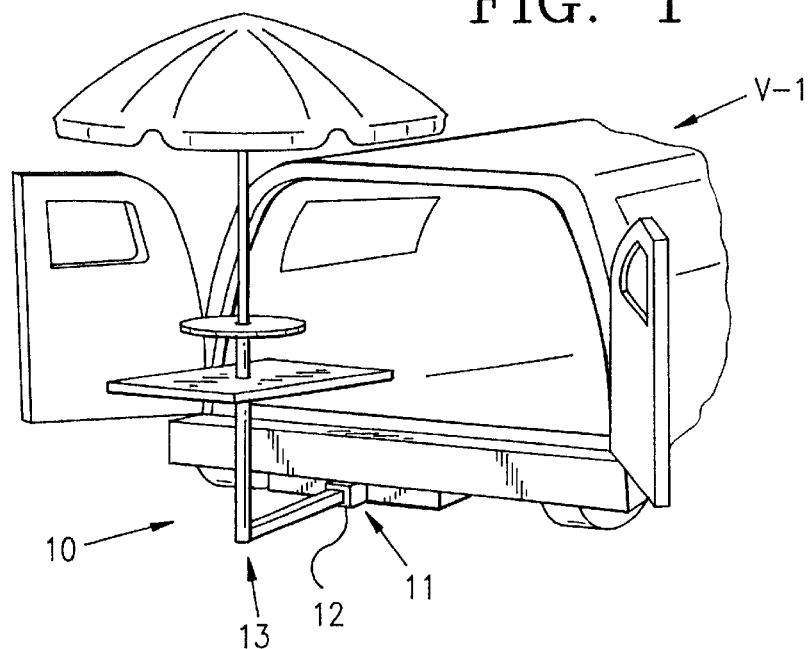
FIG. 1 is a fragmentary rear perspective view showing the invention in use with a van or a sport-utility vehicle having so-called barn doors.

Referring more specifically to the drawings, a hitch-mountable accessory according to the invention is indicated generally at 10. As illustrated and described herein, and as contemplated by the present invention, the accessory 10 comprises a table and umbrella assembly, and as depicted in FIG. 1, the assembly is shown mounted to the hitch of a vehicle V-1, such as a van or SUV. However, as depicted in FIG. 2, the assembly may also be used with other types of vehicles V-2, such as a pickup truck, or automobile (not shown), or the like.

Figure 2:
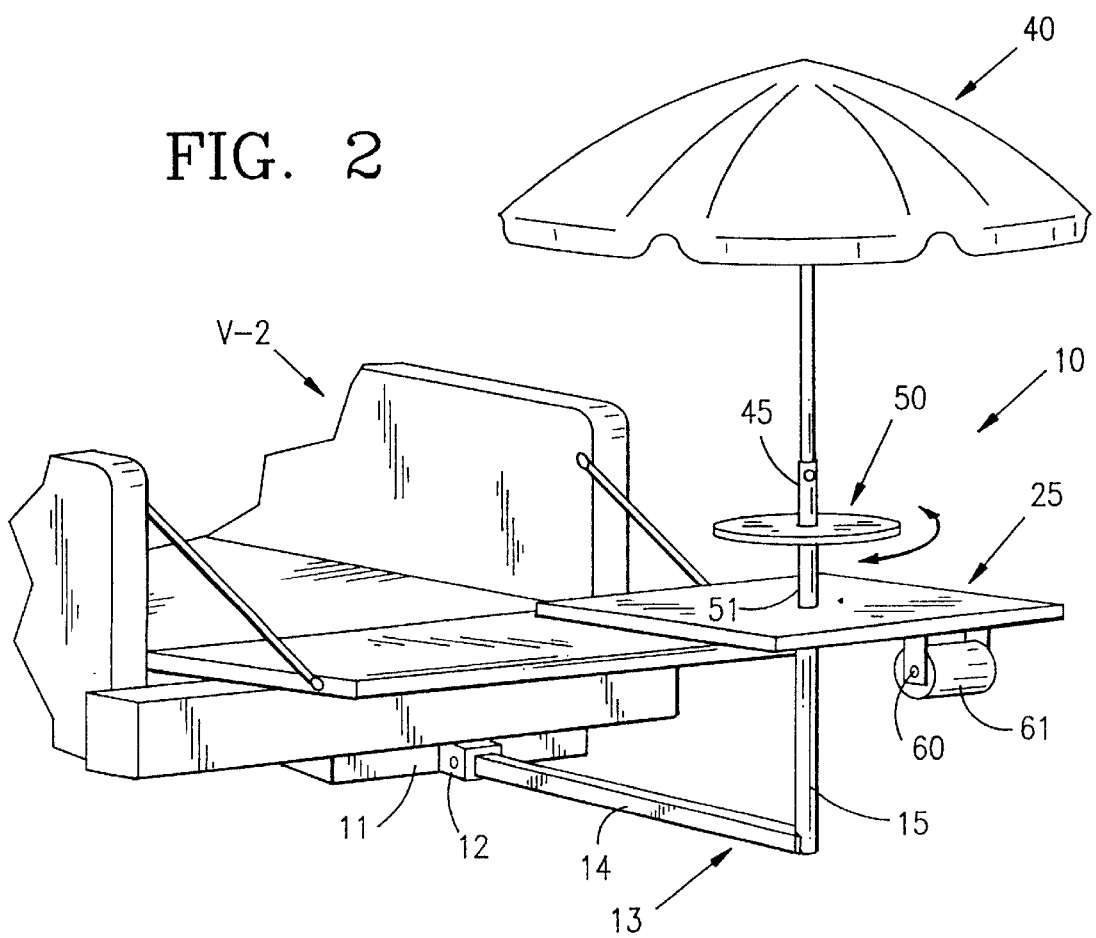
FIG. 2 is a fragmentary rear perspective view showing the invention in use with a different type of vehicle, i.e., a pickup truck having a tailgate.
Figure 3:
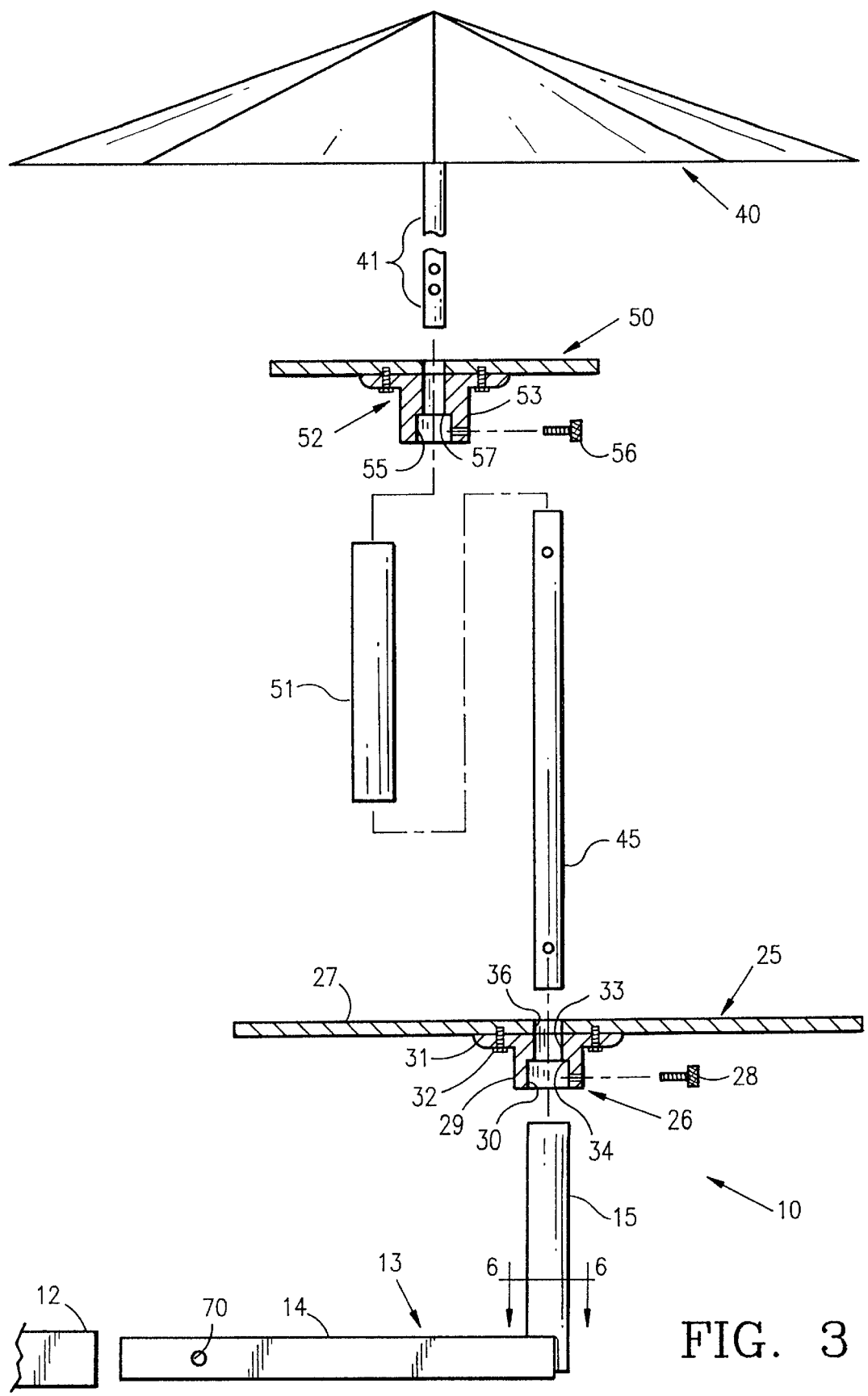
FIG. 3 is an exploded view in side elevation, with portions shown in section, of the components forming the present invention.

As shown in FIGS. 1 and 2, the vehicles V-1 and V-2 have hitch assemblies of the type having a rearwardly extending receiver tube 12 of square cross-section. The accessory 10 of the invention comprises a base member 13 having a horizontal component 14 of square cross-section adapted to be engaged in the hitch receiver 12, and a vertical component 15 of circular cross-section and extending vertically upwardly from the outer end of the horizontal component 14.

Figure 8:
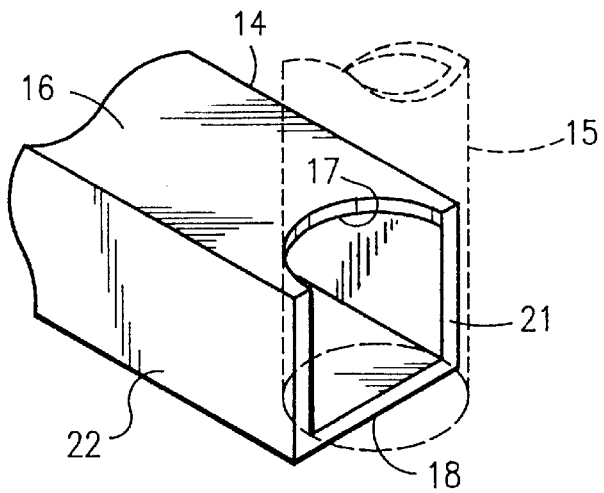
FIG. 8 is a fragmentary rear perspective view of the horizontal section of the base member, with the vertical section shown in dashed lines, and depicting how the vertical section and base section are interconnected.

As best illustrated in FIGS. 6 through 8, the outer end of upper wall 16 of the horizontal component 14 has a semi-circular cut-out 17 therein, and the vertical component 15 is nested at its lower end in this semi-circular cut-out, with the lower end of the vertical component resting on the lower wall 18 of the horizontal component 14. The vertical component 15 is also welded at 19 and 20 to the ends of sidewalls 21 and 22 of the horizontal component 14. The base member is thus a rigid, strong, one-piece member having a horizontal component of square cross-section and a vertical component of circular cross-section.

As seen best in FIGS. 3 through 5 and 10, a first table 25 is removably attachable to the upper end of vertical component 15 by means of a collar 26 on the underside of the table platform 27, and a set-screw or thumb screw 28 extended through the collar and into engagement with the upper end of the vertical section 15.

The collar 26 has a depending cylindrical skirt or neck 29 with a cylindrical inner surface 30 sized to closely slidably receive the upper end of vertical component 15. A diametrically enlarged mounting flange 31 on the upper end of the collar 26 is secured to the underside of the table platform by suitable fasteners 32 extended upwardly through the flange 31 and into the table. The upper portion 33 of the bore through the collar is reduced in diameter relative to the lower portion 30, defining a downwardly facing annular shoulder 34 against which the upper end 35 of vertical component 15 abuts when the collar is engaged on the vertical component 15. An opening or bore 36 of the same diameter as the opening 33 extends through the table 27, for a purpose described hereinafter.

The assembly of the invention may be used just as shown in FIG. 10, i.e., with only the table 25 supported on the base member 13. Alternatively, an umbrella 40 may also be supported from the base member, as indicated in dot-and-dash lines in FIG. 10, by inserting the shaft 41 of the umbrella into the tubular vertical component 15. If used in this way, the shaft 41 of the umbrella can extend all the way to the bottom of the vertical component 15, to rest on the bottom wall portion 18 of the horizontal component 14.

Figure 11:
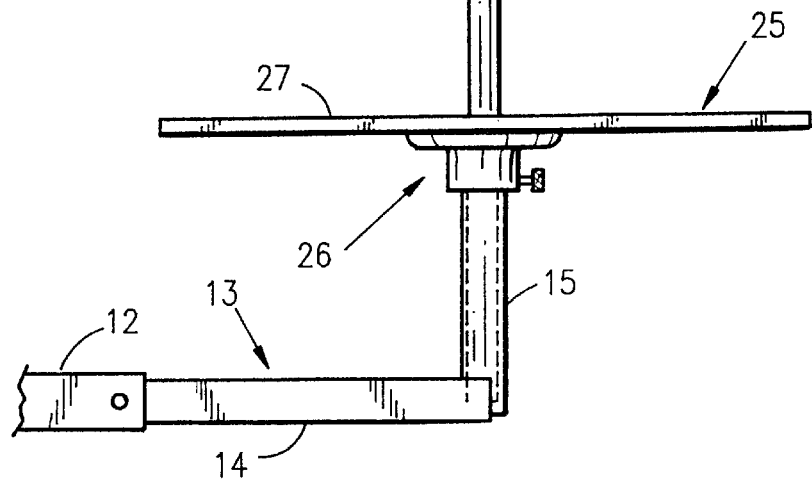
FIG. 11 is a view similar to FIG. 10, showing the adapter member used in association with the base member, first table and umbrella.

An adapter tube 45 can be telescopically engaged and supported in the vertical component 15, with its upper end extended a substantial distance above the table 25. The shaft 41 of the umbrella can then be inserted into and supported by the adapter tube 45. This is depicted in FIG. 11.

If it is desired to use a second table 50 in the assembly, then a spacer sleeve 51 is placed over the adapter tube 45, with the lower end of the spacer tube supported on top of the table 25. See FIGS. 3, 4 and 5. The second table 50 is then engaged on the upper end of the sleeve 51 by means of a collar 52 on the underside of the table, having a depending tubular section 53 with a diametrically enlarged annular flange 54 on its upper end, and an inner diameter 55 adapted to closely slidably receive the upper end of the sleeve 51. A set-screw or thumb screw 56 extends through the side of the depending tubular section 53 and into engagement with the upper end of the sleeve 51 to anchor the table 50 and sleeve 51 together. The lower end of the sleeve 51 rests upon the upper surface of the table 25, and the table 50 and sleeve 51 are free to rotate about the adapter tube 45, whereby the table 50 may be used as a Lazy Susan.

Insertion of the sleeve 51 through the collar 52 is limited by annular shoulder 57 at the upper end of the inner diameter 55, against which the upper end of the sleeve 51 abuts.

Figure 4:
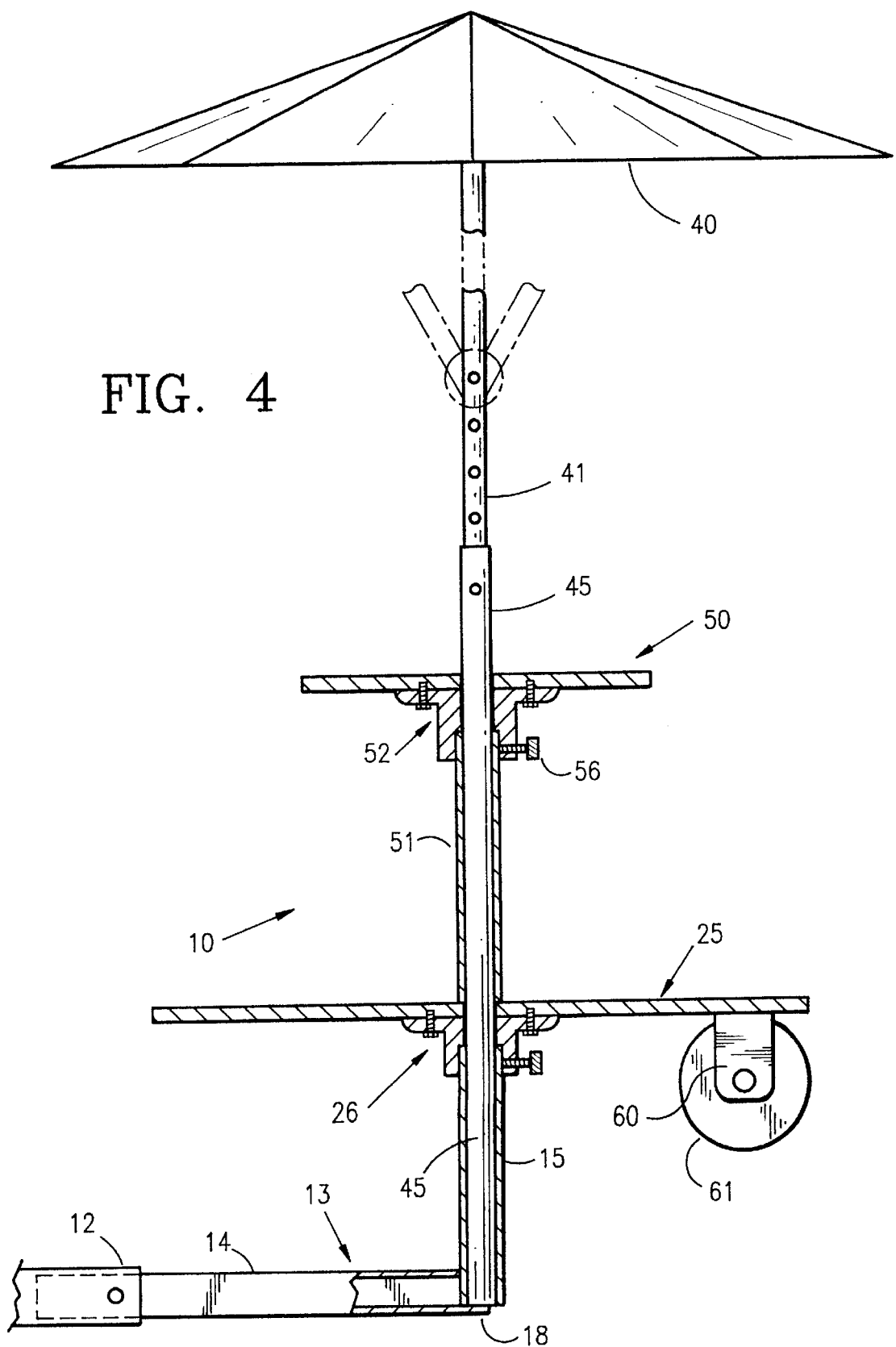
FIG. 4 is a view in side elevation, with portions shown in section, depicting the components of the invention in assembled relationship.
Figure 5:
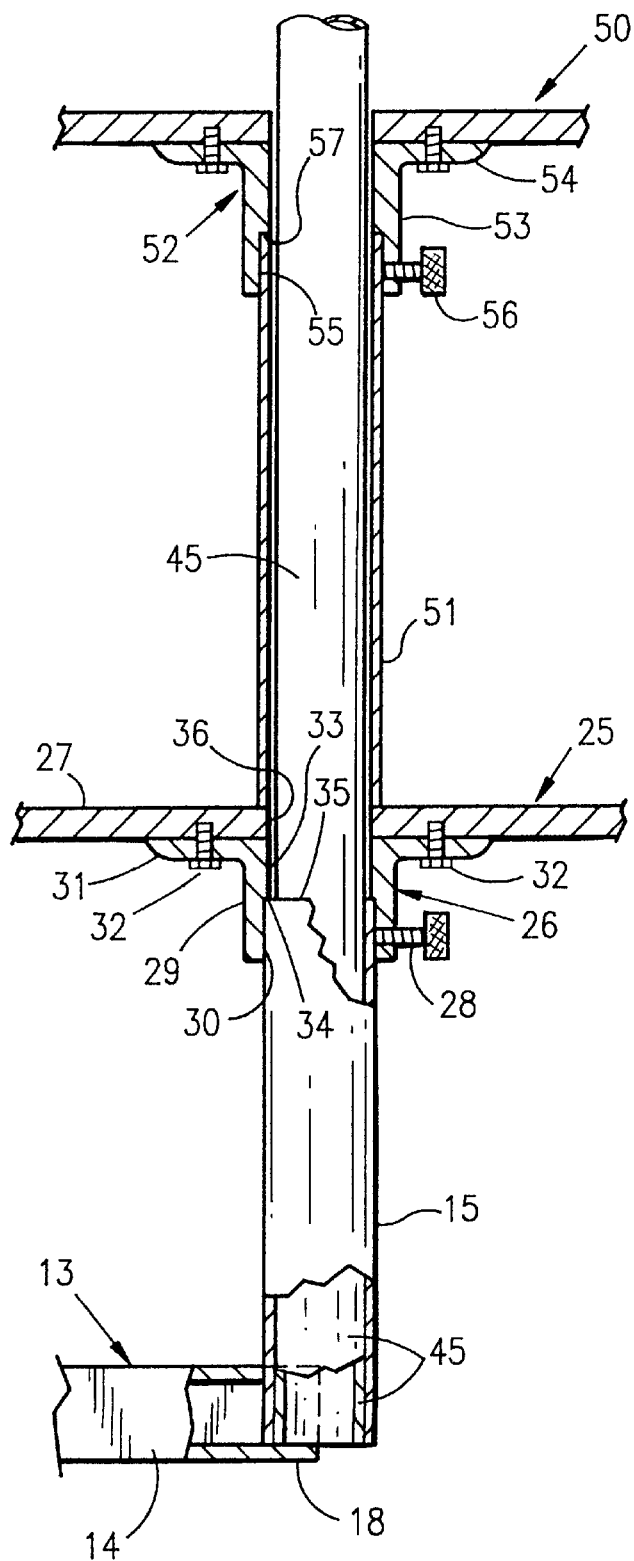
FIG. 5 is an enlarged fragmentary view in side elevation, with portions shown in section, illustrating details of construction and assembly.

As shown in FIGS. 2 and 4, a paper towel holder 60 may be mounted on the underside of the table 25 for supporting a roll of paper towels 61.

Further, as indicated in dot-and-dash lines in FIGS. 4 and 9, the umbrella may be tiltable so that it can be oriented in a desired position for optimum shading effect. The umbrella 45 may comprise a conventional patio umbrella and need not be specially constructed for use with the present invention.

Although the collars 26 and 52 have been shown and described herein as separate elements attached to the tables, the tables and collars may be integrally formed as one piece. Similarly, the horizontal and vertical components 14 and 15, respectively, of the base member 13 may be integrally formed in one piece, but it should be kept in mind that to achieve the functional aspects of the present invention, the cross-sectional configuration of the vertical component must be circular, or other means provided to permit rotation of at least the second table.

In a specific construction embodying the invention, the horizontal component 14 of the base member 13 comprises a thirty-three inch long length of steel tubing having a two-inch-by-two-inch square cross section. A ⅝ inch hole 70 is formed through one end for receipt of a hitch pin (not shown) to secure the horizontal component in the hitch receiver tube 12. The vertical component 15 comprises a nineteen inch long thin wall metal conduit having an outside diameter of one and three-quarter inches. The collars 26 and 52 can comprise one and one-half inch floor flanges and male adapters, with one-quarter inch thumb screws. The spacer sleeve 51 comprises a nine inch long length of thin wall metal conduit having an outside diameter of one and three-quarter inches. The first table 25 may be made of any suitable material, such as melamine particle board with edge banding, and the size and shape may be varied as desired. The hole 36 through the center of the table has a diameter of one and five-eighth inches, and in a specific example of the invention, the table has dimensions of one-half by twenty-four by thirty-two inches. The second table 50 may also have any suitable size and shape, such as circular or hexagonal, and may also be made of any suitable material, such as melamine particle board with edge banding. It also has a hole through its center of one and five-eighths inch diameter, and in a specific example of the invention, may be circular with a thickness of one-half inch and a diameter of twenty inches. The adapter tube 45 comprises a thirty-six inch long length of aluminum tubing, such as commonly used as a bottom pole for a patio umbrella, and has an outside diameter of one and one-half inches. The umbrella 40, as previously noted, can comprise a standard patio umbrella with a one and three-eighth inch diameter aluminum pole.

The specific dimensions and materials described herein are intended to be exemplary only, and are not to be considered necessary to the invention or as limitations thereon. The features of the invention which are considered important are the simplicity of construction and ease of assembly, as well as the versatility of use.

While particular embodiments of the invention have been illustrated and described in detail herein, it should be understood that various changes and modifications may be made to the invention without departing from the spirit and intent of the invention as defined by the scope of the appended claims.

What is claimed is:

1. A hitch-mountable table and umbrella assembly for releasable attachment to a vehicle-mounted hitch having a hitch receiver tube, comprising:
    a base member having a horizontal component and a vertical component, said horizontal component adapted to be releasably inserted into the hitch receiver tube to support the base member from the vehicle;
    a first table having means for releasably mounting the table to an upper end of the vertical component of the base member;
    an adapter member insertable into the vertical component so as to project upwardly therefrom;
    a second table having means for releasably mounting the second table on the adapter member in vertically upwardly spaced relation to the first table; and
    an umbrella having means for releasable support of the umbrella on the adapter member.

2. A hitch-mountable assembly for releasable support on a vehicle hitch of the type having a hitch receiver tube of polygonal cross-section, comprising:
    a generally L-shaped base member having a horizontal component with a polygonal cross-section for non-rotatable insertion into the hitch receiver tube, and a vertical component with a circular cross-section; and
    an accessory supportable on the vertical component of the base member, said accessory having mounting means with a circular cross-section, whereby the accessory may be rotated relative to the base member, said accessory comprising a first table mounted on the upper end of the vertical component of the base member, and a second table supported in upwardly spaced relation relative to the first table, said second table being supported by an adapter member that is supported on the base member and is freely rotatable about a vertical axis.

3. A hitch-mountable assembly as claimed in claim 2, wherein:
    the accessory comprises an umbrella releasably mounted on the base member and supported in upwardly spaced relation from the tables.

4. A hitch-mountable assembly as claimed in claim 2, wherein:
    said adapter member is telescopically engaged at a lower end thereof in said vertical component of said base member, and projects at an upper end thereof above the vertical component.

5. A hitch-mountable assembly as claimed in claim 4, wherein:
    a spacer sleeve is telescopically received over the adapter member and is rotatable relative thereto, said spacer sleeve resting at a lower end thereof on said first table and engaged at an upper end thereof with the second table to maintain the second table spaced from the first table a distance approximately equal to the length of the spacer sleeve.

6. A hitch-mountable assembly as claimed in claim 4, wherein:
    the adapter member rests at a lower end thereof on said horizontal component of the base member.

7. A hitch-mountable assembly as claimed in claim 6, wherein:
    a spacer sleeve is telescopically received over the adapter member and is rotatable relative thereto, said spacer sleeve resting at a lower end thereof on said first table and engaged at an upper end thereof with the second table to maintain the second table spaced from the first table a distance approximately equal to the length of the spacer sleeve.

8. A hitch-mountable assembly as claimed in claim 1, wherein:
    a spacer sleeve is adapted to be telescopically received over the adapter member so as to be rotatable relative thereto, said spacer sleeve adapted to rest at a lower end thereof on said first table and engaged at an upper end thereof with the second table to maintain the second table spaced from the first table a distance approximately equal to the length of the spacer sleeve, when said first and second tables are used together.

9. A hitch-mountable accessory as claimed in claim 8, wherein:
    the base member horizontal component has a polygonal cross-section for non-rotatable insertion into the hitch receiver tube, and the vertical component has a circular cross-section.

10. A hitch-mountable accessory as claimed in claim 9, wherein:

the horizontal component of the base member has a top wall, a bottom wall, opposite side walls, a first end insertable into the hitch receiver tube, and a second end distal from the first end, said top wall having a semi-circular cut-out in said second end of the horizontal component, and said vertical component is nested at a lower end thereof in the cut-out and between the side walls, with the lower end resting on the bottom wall and welded to the adjacent ends of the side walls.

11. A hitch-mountable table and umbrella assembly for releasable attachment to a vehicle-mounted hitch having a hitch receiver tube, comprising:

a base member having horizontal and vertical components, said horizontal component having first and second ends, said first end being insertable into the hitch receiver tube to non-rotatably support the base member from the vehicle, and the vertical component being tubular and having upper and lower ends, with the lower end thereof joined to the second end of the horizontal component;

a first table having means for releasably mounting the table to the upper end of the vertical component of the base member, and having a central opening therethrough;

an elongate adapter member having first and second ends, said adapter member being insertable at its first end through the central opening in the first table and into the vertical component of the base member for support of the adapter member on said base member, with the second end of the adapter member extending a substantial distance above the upper end of the vertical component;

an umbrella having an elongate shaft insertable into the adapter member, and into the vertical component of the base member, whereby the umbrella may be supported on either the adapter member or the base member; and a second table of reduced size relative to the first table and having means for mounting the second table on the adapter member in upwardly spaced relationship to the first table.

12. A hitch-mountable table and umbrella assembly as claimed in claim 11, wherein:

a spacer sleeve is engaged between the first and second tables to maintain them in spaced relationship to one another.

13. A hitch-mountable table and umbrella assembly as claimed in claim 12, wherein:

the vertical component of the base member, the adapter member, the umbrella shaft and the spacer member are all circular in transverse cross-section and have small differences in diameter whereby they may be telescopically engaged with one another with small tolerances between them, and they are rotatable relative to one another but are restrained against relative transverse movement.

14. A hitch-mountable table and umbrella assembly as claimed in claim 13, wherein:

said second table is rotatable relative to the adapter member and to the first table.

15. A hitch-mountable table and umbrella assembly as claimed in claim 11, wherein:

the umbrella is a conventional patio umbrella having an elongate cylindrical umbrella shaft;

the vertical component is circular in cross-section and has a diameter sized to closely receive the umbrella shaft so that the umbrella shaft is freely rotatable therein, and has a length and diameter such that the umbrella shaft is restrained from radial or transverse movement relative thereto and is securely supported against tilting movement; and the adapter member comprises a conventional patio umbrella bottom pole having a length and diameter to be closely received in the vertical component so as to be freely rotatable relative thereto but restrained against radial or tilting movement relative thereto, and adapted to telescopically and rotatably receive therein the umbrella shaft so that the umbrella shaft can be supported from the adapter member.

16. A hitch-mountable table and umbrella assembly as claimed in claim 15, wherein:

the patio umbrella base pole adapter member and the patio umbrella enable the assembly, including the first and second tables, the umbrella, the adapter member, and spacer, to be used with a conventional patio umbrella base rather than with the hitch-mountable base, whereby the assembly may be used interchangeably as a hitch-mountable accessory or as a patio umbrella and table set.

17. A hitch-mountable table and umbrella assembly as claimed in claim 11, wherein:

a support surface is defined on the second end of the horizontal component where it is joined to the vertical component;

said adapter member rests at its first end on the support surface, whereby it is supported by said support surface against vertical displacement; and said vertical component has a length capable of providing lateral support to the adapter member and umbrella supported thereon.

18. A hitch-mountable table and umbrella assembly as claimed in claim 17, wherein:

the vertical component comprises thin wall aluminum tubing and has a length of about nineteen inches and a diameter of about one and three-quarter inches;

the adapter member comprises thin wall aluminum tubing and has a length of about thirty-six inches and an outside diameter of about one and one-half inches; and the umbrella shaft comprises thin wall aluminum tubing and has a diameter of about one and three-eighth inches.

* * * * *